United States Patent [19]

Foley et al.

[11] 4,247,403

[45] Jan. 27, 1981

[54] METHOD OF SEALING PORES, AND LOST CIRCULATION ADDITIVE THEREFOR

[75] Inventors: Kevin M. Foley; David I. B. VanderHooven, both of Maumee, Ohio; Jerry D. Hull, Tulsa, Okla.

[73] Assignees: The Andersons; Rotary Drilling Services, Inc., both of Maumee, Ohio

[21] Appl. No.: 50,872

[22] Filed: Jun. 21, 1979

[51] Int. Cl.³ ................................................. C09K 7/02
[52] U.S. Cl. .................................. 252/8.5 LC; 175/72
[58] Field of Search ..................... 252/8.5 LC; 175/72

[56] References Cited

U.S. PATENT DOCUMENTS

| | | | |
|---|---|---|---|
| 2,812,161 | 11/1957 | Mayhew | 252/8.5 |
| 2,943,679 | 7/1960 | Scott et al. | 252/8.5 X |
| 2,943,680 | 7/1960 | Scott et al. | 252/8.5 X |

*Primary Examiner*—Herbert B. Guynn
*Attorney, Agent, or Firm*—William Preston Hickey

[57] ABSTRACT

By separating the woody ring portion of corncobs from the pith and chaff portions a lost circulation additive for drilling muds is produced which does not appreciably increase the yield point of the drilling mud. Improved particle size distributions for lost circulation additives is also given and claimed which permits low concentrations of the additive to produce seals withstanding 1000 psig.

25 Claims, No Drawings

METHOD OF SEALING PORES, AND LOST CIRCULATION ADDITIVE THEREFOR

TECHNICAL FIELD

The present invention relates to means for preventing the passage of colloidal and near colloidal size particles as well as the base fluid through openings more than 50 times larger; and more particularly to means for preventing "lost circulation" during the drilling of well bores.

BACKGROUND OF THE INVENTION

During the drilling of wells, a drilling fluid is circulated down the drill pipe past the teeth of the cutter head to sweep away the rock cuttings from the cutter head, and move them to the surface. It is essential that the cuttings be carried upwardly and out of the bore by a fluid in order that the cutter will not become clogged, and so that the drilling operation can continue for extended periods of time. The fluid that is usually used is water to which certain materials are added to produce a slurry which better lubricates the cutter head, and which has a higher specific gravity than water, so that it is better able to lift the rock cuttings to the surface.

In order to prevent the settling out of the rock cuttings in the bore, should flow stop for some reason, it is highly desirable that the slurries have thixotropic properties whereby they increase in viscosity or "gell" when flow is stopped, and thin out again when flow is again initiated. One material that is commonly used to provide such thixothrophic properties is clay. Clay type drilling slurries are called "drilling muds" and typically have a specific gravity of 1.3, and a flow viscosity at 20° C. of approximately 20 centipoise. One commonly used method of determining the flow viscosity of drilling fluids is called the Yield Point Method wherein the difference in torque of the inner bob of a direct indicating Viscometer at 300 RPM and 600 RPM is subtracted from that at 300 RPM. The torque so extrapolated to zero RPM is called the "Yield Point."

During the drilling of wells, it is a common occurance for the cutter head to pass through porous layers of gravel or rock which will not retain the drilling mud; so that circulation of the drilling mud is lost. "Muds" may contain still other special additives such as barium salts to further increase their specific gravity. With or without special additives, drilling muds are sufficiently expensive that they must be continuously recirculated. The muds are brought to the surface, the rock cuttings removed, and the muds are pumped back down the well. Seepage of drilling muds into porous strata may plug off oil bearing layers, or gas producing layers to make the well being drilling, worthless, and this is another reason why their loss must be prevented.

The art has long added materials to drilling muds for the purpose of sealing off porous subterranian layers through which the drilling cutters pass. It has been said that "everything under the sun" has been tried as a "lost circulation additive" to seal off subterranian porous layers. As far as we are aware, there has never been a set of criterion developed whereby the effectiveness of a potential sealing material can be predicted before testing. The America Petroleum Institute has developed a testing procedure that is set forth in their standard R. P. 13B Section 10 entitled: Standard Procedure For Testing Drilling Fluids for testing under conditions which simulate the kinds of porosity that exists in subterranean strata. The A. P. I. apparatus comprises a vertical chamber approximately 73 mm in diameter at the bottom for supporting a marble bed approximately 57 mm high. The bottom of the chamber has an outlet in which slotted plates can be inserted and removed to check the effectiveness of the material relative to cracks of various widths. A sample of three thousand five hundred cubic centimeters of drilling mud containing a potential sealing additive is poured into the vertical column on top of the marble bed, and the slurry is allowed to drain by gravity until a seal occurs. The amount of effluent is measured, and thereafter a gas pressure is gradually applied on top of the liquid. This gas pressure is containually increased and the amount of effluent is measured when a seal occurs. The seals may be blown out and a new one formed, one or more times, until a maximum of 1000 psi (70.3 KGF per sq. cm.) is developed in the column. For the test results tabulated below, marbles having a uniform diameter of 14.3 mm were used. In the slot test results tabulated below, the marbles were removed so that free fluid access to the slot plate existed. The slot used in the tests had a width of 5 mm except for the tests in Examples 13, 14 and 15 in which a slot of 3 mm was used.

The prior art is replete with test results that have been made of all kinds of lost circulation additives, in either actual wells, or in screening tests using the above described A. P. I. testing procedure. These materials have ranged from straw, nutshells, ground whole corncobs, and dough balls, to strips of rubber or cellophane. It will be understood that a maximum of additive particle size which can be used occurs because of the nozzle sizes which are used in the cutter heads to direct the drilling mud at the cutter teeth. The nozzle sizes used may be as small as 8 mm and so it is highly desirable that the particle size of the additive not be larger than 8 mm so that the additive can be universally used. The nature of the problem will now be apparent, since it is necessary to seal openings using particles having a diameter that is less than, or only slightly larger than the width of the hole which the particles are intended to seal. It can now be seen why the art has tried to use straw and strips of cellophane having a length greater than 2.54 cm; and it will further be apparent that the use of such materials can create plugging and other problems in the recirculating equipment for the muds.

As previously explained, drilling muds are thixotropic and will have a yield point which generally cannot be exceeded without creating problems. It is highly desirable, therefore, that the drilling muds devoid of lost circulation additives, and which are continually recirculated will themselves approach this yield point, in order that the drilling mud will have as great a rock chip suspending capability as is possible during normal operation. This being true, it is highly desirable that the lost circulation material additive have no appreciable effect on the yield point of the drilling muds. Most of the materials that have been tried heretofore including ground corncobs, greatly increased the yield point of the drilling muds, and therefore create problems when used. Ground walnut shells do not greatly increase the yield point and so have been used extensively. Ground walnut shells, however, have size limitations, are in limited supply, and are relatively expensive.

With this background, it is an object of the present invention to provide a more effective lost circulation additive which will not greatly affect the yield point of drilling muds.

Another object of the present invention is the provision of a lost circulation additive of the above described type, which can be obtained from common, and inexpensive, and readily available materials, and so is more economical than the prior art materials.

Further objects and advantages of the invention will be apparent to those skilled in the art to which the invention relates from the following description of applicants' preferred embodiments.

DESCRIPTION OF THE PREFERRED EMBODIMENTS

The "yield point" of several prior art materials was determined by using the procedure of paragraph 10.3 of the A. P. I. standard previously referred to. The base mud used in our tests was made by using 275 grams of Wyoming-type bentonite that was aged a minimum of 72 hours in 3500 cc of water to give an apparent viscosity of 20 centipoise, after stiring 10 minutes by a multimixer. This corresponds to a yield point of 20 lbs/100 ft.$^2$ on the test bentonite.

The apparent viscosity in centipoise equals the 600 RPM dial reading of a direct indicating viscometer divided by two. By using the procedure previously explained this would translate to a yield point of 20 lbs/100 ft.$^2$ on the test bentonite. Using this same procedure, when ground walnut shells, having the following analysis was mixed into the mud at a concentration of 300 grams per 3500 cc of the mud, the yield point was 21 lbs/100 ft.$^2$.

Grade +8 (See screen analysis below) 20%
Grade −14+20 20%
Grade −20+40 40%
Grade −40 20%

When 300 grams of whole corncobs ground to pass through a ¼ inch screen is substituted for the walnut shells, the mixture has a yield point of 47 lbs/100 ft.$^2$. These tests indicate that whole ground corncobs are highly undesirable as a "lost circulation additive."

Corncobs comprise four principle parts that are arranged concentrically. The center portion is a very light density pith core, that is surrounded by a woody ring, that in turn is surrounded by a coarse chaff portion, that in turn is covered by a fine chaff portion. The coarse and fine chaff portions form the sockets for anchoring the corn kernels to the corncob. The normal methods of grinding corncobs produces a mixture of all four parts enumerated above. It is possible, however, to separate the woody ring material from the remainder of the cob using the following procedure.

The cobs are crushed, hammer milled and screened to provide a fraction that passes through a 3/8 inch mesh screen and which stands upon a six mesh screen. This material is then roller milled, attrition milled, and aspirated to remove the lighter pith and chaff portions that cling to the woody ring portion. This material will typically have a density of between 20 to 30 lbs/ft.$^3$ depending upon particle size. The chaff portion on the other hand has a density of approximately 7 to 19 lbs/ft.$^3$ and the pith portion has a density of approximately 4 lbs/ft.$^3$. For the method of determining lbs/ft.$^3$ see "Test Weight per Bushel Apparatus" in chapter XI of the U. S. D. A. "Equipment Manual, O. R. Instruction 916-6 dated Nov. 10, 1969."

In any commercial or large scale screening operation, the separated materials will have a screen analysis that is slightly different from that that is obtaned from the same size screens in the more thorough laboratory apparatus. The following Table 1 is a laboratory analysis of the particle sizes or grades produced by large scale equipment for the air aspirated materials which are predominantly chaff and pith containing materials, for the woody ring materials, and for the −0.32 cm ground corncob materals. The laboratory equipment used was a standard Rotap screening apparatus equipped with standard U.S. mesh screens of the sizes indicated.

According to principles of applicants' invention, they have discovered that materials made from the woody ring, portion of corncobs have substantially no effect on the yield point of drilling muds; and in this respect is comparable or better than walnut shells, or any other material with which we are familiar. On the other hand, whole ground corncobs cause a pronounced increase in the yield point of drilling muds to which they are added. It has been found that the chaff portions have a pronounced effect; and therefore it is believed that the chaff and pith portions of the cob are what causes whole ground cobs to produce muds having excessively high yield points. Applicants have made tests of blends of different size woody ring materials with air aspirated portions of the cob; and Table 2 is a tabulation of these blends. Whole ground corncobs larger than approximately 14 mesh typically have a bulk density of from 12 to 16 lbs/ft.$^3$. It will be understood that any separation technique always allows some of the unwanted materials to enter with the desired fraction as indicated in Table 1.

TABLE 1

| ROTAP U.S. Std. Sizes | Production Screened Material | | | | | | | | |
|---|---|---|---|---|---|---|---|---|---|
| | +10 Air Aspirated | 10/30 Air Aspirated | −30 Air Aspirated | +8 Woody Ring | 8/14 Woody Ring | 14/20 Woody Ring | 20/40 Woody Ring | −40 Woody Ring | −0.32 cm Ground Corncobs |
| +⅜" | 0.0% | 0.0% | 0.0% | 0.0% | 0.0% | 0.0% | 0.0% | 0.0% | 0.0% |
| −⅜ + 5/16 | 0.0 | 0.0 | 0.0 | 0.0 | 0.0 | 0.0 | 0.0 | 0.0 | 0.0 |
| −5/16 + 4 | 0.1 | 0.0 | 0.0 | 4.8 | 0.0 | 0.0 | 0.0 | 0.0 | 0.0 |
| −4 + 6 | 3.1 | 0.0 | 0.0 | 64.6 | 0.0 | 0.0 | 0.0 | 0.0 | 17.0 |
| −6 + 8 | 4.6 | 0.0 | 0.0 | 27.3 | 0.2 | 0.0 | 0.0 | 0.0 | 28.5 |
| −8 + 10 | 20.6 | 0.1 | 0.0 | 3.0 | 6.2 | 0.0 | 0.0 | 0.0 | 10.3 |
| −10 + 14 | 59.1 | 7.1 | 0.0 | 0.2 | 56.5 | 0.4 | 0.0 | 0.0 | 12.1 |
| −14 + 20 | 12.2 | 41.3 | 0.0 | 0.1 | 36.2 | 61.3 | 0.2 | 0.0 | 15.7 |
| −20 + 30 | 0.2 | 32.7 | 0.3 | 0.0 | 0.7 | 37.5 | 42.2 | 0.0 | 7.7 |
| −30 + 40 | 0.1 | 11.8 | 3.6 | 0.0 | 0.1 | 0.7 | 42.3 | 0.4 | 4.5 |
| −40 + 50 | 0.0 | 6.4 | 19.1 | 0.0 | 0.1 | 0.1 | 15.1 | 21.4 | 2.3 |
| −50 + 60 | 0.0 | 0.5 | 10.9 | 0.0 | 0.0 | 0.0 | 0.2 | 18.5 | 0.8 |
| −60 + 100 | 0.0 | 0.1 | 24.1 | 0.0 | 0.0 | 0.0 | 0.0 | 32.9 | 0.5 |
| −100 | 0.0 | 0.0 | 42.0 | 0.0 | 0.0 | 0.0 | 0.0 | 26.8 | 0.6 |
| Bulk Dens. | | | | | | | | | |

TABLE 1-continued

| ROTAP U.S. Std. Sizes | Production Screened Material | | | | | | | | |
|---|---|---|---|---|---|---|---|---|---|
| | +10 Air Aspirated | 10/30 Air Aspirated | −30 Air Aspirated | +8 Woody Ring | 8/14 Woody Ring | 14/20 Woody Ring | 20/40 Woody Ring | −40 Woody Ring | −0.32 cm Ground Corncobs |
| lbs./ft.$^3$ | 11.2 | 14.4 | 17.52 | 26.32 | 30.48 | 29.1 | 23.6 | 20.1 | |

TABLE 2
YIELD POINT OF BLENDS

| Materials | Blends in Grams per 3500 cc Mud | | | | | | | | |
|---|---|---|---|---|---|---|---|---|---|
| | #1 | #2 | #3 | #4 | #5 | #6 | #7 | #8 | #9 |
| +8 Woody Ring | 75 | 75 | 75 | 0 | 0 | 75 | 0 | 75 | 75 |
| −8 +14 Woody Ring | 75 | 75 | 0 | 75 | 0 | 0 | 75 | 0 | 0 |
| 20 +40 Woody Ring | 75 | 75 | 75 | 75 | 0 | 0 | 75 | 75 | 0 |
| −40 Woody Ring | 75 | 0 | 75 | 75 | 75 | 75 | 75 | 0 | 0 |
| +10 Air Aspirated | 0 | 0 | 0 | 75 | 75 | 75 | 75 | 75 | 75 |
| −10 +30 Air Aspirated | 0 | 0 | 75 | 0 | 75 | 75 | 0 | 0 | 75 |
| −30 Air Aspirated | 0 | 75 | 0 | 0 | 75 | 0 | 0 | 75 | 75 |
| Fann VG viscometer Data | | | | | | | | | |
| Apparent Visc. cps | 40 | 40 | 45 | 60 | 65 | 60 | 60 | 58 | 64 |
| Dial Reading @ 600 RPM | 80 | 80 | 90 | 120 | 130 | 120 | 120 | 116 | 129 |
| Dial Reading @ 300 RPM | 50 | 54 | 60 | 80 | 95 | 84 | 80 | 84 | 96 |
| Plastic Viscosity cps | 30 | 26 | 30 | 40 | 35 | 36 | 40 | 32 | 32 |
| Yield Point lbs/100 ft.$^2$ | 20 | 28 | 30 | 40 | 60 | 48 | 40 | 52 | 64 |

Table 3 below, gives the yield points of mixtures containing 300 grams of various corncob fractions mixed with 3500 cc of a paragraph 10.3 mud. It will be seen that as the bulk density of the corncob fraction is reduced, the yield paint goes up markedly.

TABLE 3

| Bulk Density-lbs/ft.$^3$ | Yield Point lbs/100 ft.$^2$ |
|---|---|
| 25 | 20 |
| 24.3 | 28 |
| 21.2 | 30 |
| 18 | 48 |

Depending upon particle size, pure woody ring material will have a bulk density of between approximately 20 to 30 pounds per cubic foot; and it will be seen that bulk densities as low as approximately 20 to 21 lbs/ft.$^3$ will give a yield point of less than approximately 30 lbs/100 ft$^2$. Therefore, a corncob fraction having a density of as low as 20 lbs/ft.$^3$ may have a useful purpose, although the preferred material will have a bulk density of approximately 25 lbs/ft.$^3$ or greater.

After having made applicants' discovery, extensive tests were made to determine the sealing ability of the woody ring portions of the corncob, using the A. P. I. procedure previously described. Table 4 is a compilation of some of these tests. The table shows, that the woody ring portion of the corncob performs as well or better as a Lost Circulation Additive, both in sealing ability and effect on yield point, as do ground walnut shells. Prior to the present invention walnut shells have been one of the best materials that has ever been found.

TABLE 4

| Example | % Particle Size - U.S. Std. Screen - Production Grade | | | | | Grams per 3500cc | Material Tested | Volume Before Pressure | Volume at 100psig | psig Seal Complete | Fail Pressure psig | Total Volume |
|---|---|---|---|---|---|---|---|---|---|---|---|---|
| | +8 | 8-14 | 14-20 | 20-40 | −40 | | | | | | | |
| 1-1S5 | | −.32 cm. ground corn cobs | | | | 300 | Whole Cob | Trace | 200 | 300 | 1000+ | 400 |
| 1-1M | | −.32 cm. ground corn cobs | | | | 300 | Whole Cob | 100 | 800 | 1000 | 1000+ | 2000 |
| 2-1S5 | 20 | 20 | 20 | 20 | 20 | 400 | Woody R. | Trace | 100 | 800 | 1000+ | 450 |
| 2-1M | 20 | 20 | 20 | 20 | 20 | 400 | Woody R. | Trace | 700 | 800 | 1000+ | 1900 |
| 2-2S5 | 20 | 20 | 20 | 20 | 20 | 300 | Woody R. | Trace | 100 | 400 | 1000+ | 2700 |
| 2-2M | 20 | 20 | 20 | 20 | 20 | 300 | Woody R. | 100 | 200 | 1000 | 1000+ | 1400 |
| 2-3S5 | 20 | 20 | 20 | 20 | 20 | 200 | Woody R. | Trace | 100 | 400 | 1000+ | 2500 |
| 2-3M | 20 | 20 | 20 | 20 | 20 | 200 | Woody R. | 400 | 600 | — | 900 | ALL |
| 3-1S5 | 20 | 20 | 20 | 0 | 40 | 400 | Woody R. | Trace | 100 | 800 | 1000+ | 2400 |
| 3-1M | 20 | 20 | 20 | 0 | 40 | 400 | Woody R. | Trace | 200 | 1000 | 1000+ | 1400 |
| 3-2S5 | 20 | 20 | 20 | 0 | 40 | 300 | Woody R. | Trace | 100 | 900 | 1000+ | 2300 |
| 3-2M | 20 | 20 | 20 | 0 | 40 | 300 | Woody R. | 300 | 400 | 1000 | 1000+ | 1800 |
| 3-3S5 | 20 | 20 | 20 | 0 | 40 | 200 | Woody R. | Trace | 200 | 800 | 1000+ | 2500 |
| 3-3M | 20 | 20 | 20 | 0 | 40 | 200 | Woody R. | 400 | 700 | — | 900 | ALL |
| 4-1S5 | 30 | 20 | 10 | 10 | 30 | 300 | Woody R. | Trace | Trace | 1000 | 1000+ | 100 |
| 4-1M | 30 | 20 | 10 | 10 | 30 | 300 | Woody R. | Trace | Trace | 1000 | 1000+ | 1000 |
| 4-2S5 | 30 | 20 | 10 | 10 | 30 | 200 | Woody R. | Trace | Trace | 400 | 1000+ | 2600 |
| 4-2M | 30 | 20 | 10 | 10 | 30 | 200 | Woody R. | 200 | 400 | 1000 | 1000+ | 1350 |
| 4-3S5 | 30 | 20 | 10 | 10 | 30 | 150 | Woody R. | Trace | Trace | 800 | 1000+ | 2700 |
| 4-4M | 30 | 20 | 10 | 10 | 30 | 150 | Woody R. | 400 | 500 | — | 900 | ALL |
| 5-1S5 | 40 | 10 | 20 | 0 | 30 | 200 | Woody R. | Trace | −100 | 300 | 1000+ | 300 |
| 5-1M | 40 | 10 | 20 | 0 | 30 | 200 | Woody R. | 200 | 400 | 800 | 1000+ | 1100 |
| 5-2S5 | 40 | 10 | 20 | 0 | 30 | 150 | Woody R. | 100 | −200 | 400 | 1000+ | 200 |
| 5-2M | 40 | 10 | 20 | 0 | 30 | 150 | Woody R. | 400 | 500 | 800 | 1000+ | 1400 |
| 5-3S5 | 40 | 10 | 20 | 0 | 30 | 100 | Woody R. | Trace | 100 | 200 | 1000+ | 250 |
| 5-3M | 40 | 10 | 20 | 0 | 30 | 100 | Woody R. | 500 | 800 | 1000 | 1000+ | 2500 |
| 6-1S5 | 40 | 0 | 20 | 0 | 40 | 300 | Woody R. | Trace | −100 | 600 | 1000+ | 100 |

TABLE 4-continued

| Example | % Particle Size - U.S. Std. Screen - Production Grade | | | | | Grams per 3500cc | Material Tested | Volume Before Pressure | Volume at 100psig | psig Seal Complete | Fail Pressure psig | Total Volume |
|---|---|---|---|---|---|---|---|---|---|---|---|---|
| | +8 | 8–14 | 14–20 | 20–40 | −40 | | | | | | | |
| 6-1M | 40 | 0 | 20 | 0 | 40 | 300 | Woody R. | Trace | 100 | 1000 | 1000+ | 600 |
| 6-2S5 | 40 | 0 | 20 | 0 | 40 | 200 | Woody R. | Trace | −50 | 500 | 1000+ | 200 |
| 6-2M | 40 | 0 | 20 | 0 | 40 | 200 | Woody R. | 300 | 400 | 1000 | 1000+ | 1200 |
| 6-3S5 | 40 | 0 | 20 | 0 | 40 | 150 | Woody R. | Trace | 300 | 500 | 1000+ | 2350 |
| 6-3M | 40 | 0 | 20 | 0 | 40 | 150 | Woody R. | 450 | 700 | 900 | 1000+ | 1800 |
| 6-4S5 | 40 | 0 | 20 | 0 | 40 | 100 | Woody R. | Trace | 200 | 1000 | 1000+ | 2400 |
| 6-4M | 40 | 0 | 20 | 0 | 40 | 100 | Woody R. | 350 | 1000 | 1000 | 1000+ | 2800 |
| 7-1S5 | 40 | 0 | 20 | 0 | 40 | 100 | Walnut S. | 1600 | ALL | — | −100 | ALL |
| 7-1M | 40 | 0 | 20 | 0 | 40 | 100 | Walnut S. | 1300 | 1600 | 900 | 1000+ | 2400 |
| 8-1S5 | 35.5 | 0 | 46.1 | 0 | 18.4 | 200 | Woody R. | Trace | 100 | 800 | 1000+ | 500 |
| 8-1M | 35.5 | 0 | 46.1 | 0 | 18.4 | 200 | Woody R. | 300 | 600 | 1000 | 1000+ | 1800 |
| 8-2S5 | 35.5 | 0 | 46.1 | 0 | 18.4 | 100 | Woody R. | 150 | 200 | 900 | 1000+ | 2600 |
| 8-2M | 35.5 | 0 | 46.1 | 0 | 18.4 | 100 | Woody R. | 550 | 950 | 1000 | 1000+ | 2200 |
| 9-1S5 | 46.3 | 0 | 29.6 | 0 | 24.1 | 150 | Woody R. | Trace | 150 | 300 | 1000+ | 300 |
| 9-1M | 46.3 | 0 | 29.6 | 0 | 24.1 | 150 | Woody R. | 200 | 600 | 1000 | 1000+ | 1850 |
| 9-2S5 | 46.3 | 0 | 29.6 | 0 | 24.1 | 100 | Woody R. | Trace | −100 | 350 | 1000+ | 200 |
| 9-2M | 46.3 | 0 | 29.6 | 0 | 24.1 | 100 | Woody R. | 550 | 900 | 1000 | 1000+ | 2300 |
| 10-1S5 | 20 | 0 | 20 | 40 | 20 | 400 | Woody R. | Trace | 100 | 1000 | 1000+ | 400 |
| 10-1M | 20 | 0 | 20 | 40 | 20 | 400 | Woody R. | Trace | 600 | 1000 | 1000+ | 2150 |
| 10-2S5 | 20 | 0 | 20 | 40 | 20 | 300 | Woody R. | Trace | −100 | 800 | 1000 | 2500 |
| 10-2M | 20 | 0 | 20 | 40 | 20 | 300 | Woody R. | Trace | 300 | — | 800 | ALL |
| 11-1S5 | 20 | 20 | 20 | 20 | 20 | 400 | +8R-8S | Trace | Trace | 600 | 1000+ | Trace |
| 11-1M | 20 | 20 | 20 | 20 | 20 | 400 | +8R-8S | 300 | 400 | 900 | 1000+ | 800 |
| 11-2S5 | 20 | 20 | 20 | 20 | 20 | 300 | +8R-8S | Trace | Trace | — | 950 | ALL |
| 11-2M | 20 | 20 | 20 | 20 | 20 | 300 | +8R-8S | 400 | 600 | 1000 | 1000+ | 1200 |
| 11-3S5 | 20 | 20 | 20 | 20 | 20 | 200 | +8R-8S | 550 | 650 | — | 800 | ALL |
| 11-3M | 20 | 20 | 20 | 20 | 20 | 200 | +8R-8S | Trace | 100 | 1000 | 1000+ | 2100 |
| 12-1S5 | 20 | 20 | 20 | 20 | 20 | 400 | +40S-40R | 400 | 2300 | 1000 | 1000+ | 2400 |
| 12-1M | 20 | 20 | 20 | 20 | 20 | 400 | +40S-40R | 400 | 500 | 1000 | 1000+ | 1800 |
| 12-2S5 | 20 | 20 | 20 | 20 | 20 | 300 | +40S-40R | 1000 | ALL | — | −100 | ALL |
| 12-2M | 20 | 20 | 20 | 20 | 20 | 300 | +40S-40R | 800 | 1200 | 1000 | 1000+ | 2300 |
| 13-1S3 | 0 | 40 | 0 | 20 | 40 | 300 | Woody R. | Trace | Trace | 500 | 1000+ | 2800 |
| 13-1M | 0 | 40 | 0 | 20 | 40 | 300 | Woody R. | Trace | 100 | 1000 | 1000+ | 1750 |
| 14-1S3 | 0 | 35 | 15 | 15 | 35 | 300 | Woody R. | Trace | 300 | 300 | 1000+ | 2750 |
| 14-1M | 0 | 35 | 15 | 15 | 35 | 300 | Woody R. | 1900 | 2600 | 400 | 1000+ | 3300 |
| 15-1S3 | 0 | 50 | 20 | 0 | 30 | 200 | Woody R. | Trace | Trace | 500 | 1000+ | 2500 |
| 15-1M | 0 | 50 | 20 | 0 | 30 | 200 | Woody R. | 200 | 2800 | 200 | 1000+ | 3000 |

The example numbers given in Table 4 have a prefix which designates a series of tests, and a suffix separated therefrom by a dash. The first number of the suffix indicates a concentration level; S5 indicates a 5 mm slot test; S3 indicates a 3 mm slot test; and M indicates a marble test. The marble test was made per the above indicated A.P.I. procedure using marbles having a diameter of 14.3 mm; and the slot tests were made with the marbles removed for ready access to the slot plate installed in the outlet of the column.

In the table, the particle sizes given are those obtained in a commercial size screening apparatus using the U.S. Standard screens indicated. The grade designated +8 are those materials which passed a 5/16 inch shaker screen but stood on a number 8 shaker screen. The 8/14 grade material is that which passed through a number 8 shaker screen and stood upon a number 14 shaker screen. The 14/20 grade material passed through a number 14 shaker screen and stood upon a number 20 shaker screen; the 20/40 grade material passed through a number 20 screen and stood upon a number 40 screen; and the −40 material passed through a 40 mesh shaker screen.

In the table, the grams per 3500 cc column indicates the grams of additive having the grades indicated that were added to 3500 cc of the section 10.3 mud. In the material tested column, "whole cob" means whole ground corncobs; "Woody R." means woody ring material that is essentially pure; "Walnut S." and "S" means walnut shells; "R" means woody ring material; "+8R-8S" means that the +8 particle sizes are woody ring and that the −8 particle sizes are walnut shells; and "+40S-40R" means those sizes larger than 40 mesh are walnut shells and less than 40 mesh are woody ring material.

The column designated Volume Before Pressure, indicates the number of ml of liquid which drained from the apparatus before pressure was applied. The column headed Volume At 100 psig is the total amount of ml that was collected from the apparatus at the time that 100 psig of gas pressure was applied to the top of the column. The column designated psig Seal Complete indicates the pressure at which a seal was first produced. The column headed Fail Pressure psig indicates the maximum pressure that the sealing additive withstood. Where 1000+ is indicated, the sealing materials withstood the final 1000 psig of gas pressure applied to the top of the column. The column headed Total Volume is the total effluent in ml's that passed through the column during the test.

Example 1-1S5 indicates that minus 0.32 cm whole ground cobs, at a concentration of 300 grams in 3500 cc of mud sealed the 5 mm slot when the pressure reached 300 psig and that a total of 400 cc of effluent passed when 1000 psig was reached. Example 1-1M indicates that the minus 0.32 cm cobs allowed considerable more liquid to pass through the marble bed and that a seal was only developed at 1000 psig after 2000 ml of liquid had passed.

Examples 2-1S5 and 2-1M indicates that a better seal was formed when 400 grams of 20% of each of five different sizes of woody ring particles were used in 3500 cc of mud. The yield point of this mixture of woody ring material was considerably less than that of the whole ground corncobs.

Examples 3-1S5 through 3-3M indicate that when no 20/40 grade material was used, but a corresponding larger percentage of −40 mesh material was added, more effluent generally passed through the 5 mm slot before forming the seal.

Examples 4-1S5 through 4-3M show that the amount of additive can be decreased when more of the larger particle size is used. These tests show an effectiveness at a concentration as low as 150 grams per 3500 cc of mud.

Examples 5-1S5 through 5-3M show that even less of the additive can be used if the amount of +8 material is increased to 40% and the minus 40 material is decreased to 30%. It is indeed surprising that as little as 100 grams per 3500 cc of mud is effective to produce a seal at 1000 psig.

Examples 6-1S5 through 6-4M indicate that the substitution of more −40 material for the 8/14 grade materials does not add to the sealing ability over that of the series 5 tests. On the other hand, example 6 materials did surprisingly good at the low concentration levels. These tests would indicate that 3 particle sizes are all that are needed to form a bridge over the openings in the marble bed or slot, and filter out the colloidal or near colloidal size clay particles.

Examples 7-1S5 through 7-1M were made of a blend of all walnut shell particles. These tests show that the walnut shells at the 100 gram level were not capable of effecting a seal at 1000 psig of the 5 mm slot. In general the woody ring material is as good or better than the walnut shell materials tested.

Examples 8-1S5 through 8-2M indicate what happens when the +8 grade concentration is decreased, the 14/20 grade is increased; and the minus 40 grade is decreased from the level used in the series 6 tests. These tests indicate that this mixture seals the marble bed better than did Example 6-4M, but allowed slightly more effluent through the 5 mm slot. It also suggests that as little as 10% of particles less than 420 micron in size would be effective.

Examples 9-1S5 through 9-2M are tests of what happens when the +8 grade concentration is increased and the 14/20 grade concentration is increased slightly. This mixture greatly reduced the amount of material needed to seal the 5 mm slot. The amount required to seal the marble bed was approximately the same. It should be pointed out that the concentration used in Examples 9-1S5 through 9-2M are exceedingly small; and yet were able to effect a seal that withstood over 1000 psig.

Examples 10-1S5 through 10-2M compared to the series 2 tests indicate the importance of the larger plus 8 material and that the 8/14 materials are not essential. It would also seem that the 20/40 particle size material is not only not important, but may even interfer with the sealing ability of a blend of the +8, 14/20, and the minus 40 grade materials.

Examples 11-1S5 through 11-3M were made to see what occurs when the larger woody ring material is substituted for the larger size walnut shell particles. This mixture at the 300 grams concentration level is as good as the all walnut shell material, but did not produce a seal at 1000 psig for the 5 mm slot.

Examples 12-1S5 through 12-2M were made to see the effect of substituting small −40 grade woody ring material for the −40 walnut shell material. These tests would seem to indicate that no improvement is had by substituting the fine woody ring material for the fine walnut shell material, and in fact that any material may be equally effective for the smaller size fraction.

Examples 13 through 15 were made to see the effect of substituting the 8/14 grade material for the +8 grade when sealing a 3 mm slot. The 8/14 grade material does not have a particle larger than 3 mm, and so requires a bridging action of two or more particles to seal the 3 mm slot. The tests definitely indicate that the woody ring materials are capable of producing a bridge of two or more particles to effect a seal at 1000 psig. It would seem that more than approximately 5% by weight of particles larger than 2.4 mm should be used to seal a 5 mm slot.

As a general observation from the above tests it appears that effective lost circulation additives can be formulated using from approximately 10% to 60% by weight of particles ranging in size between 8.0 mm and 1.4 mm, from approximately 10% to 60% by weight of particles ranging in size between 1.4 mm and 0.4 mm, and from approximately 10% to 60% by weight of particles ranging in size between 0.4 mm and 75 micron.

From the tests which have been made, it appears that a seal is only made by straining out the colloidal or near colloidal size clay particles on an assemblage of the lost circulation additive particles. It further appears that a tight seal is best effected by causing particles of a first size to be caught in the intersticies between particles of a second size having a diameter that is approximately 3 to 5 times larger than the particle which they catch; that the second size particles in turn must be caught in the intersticies between particles of a third size that is 3 to 5 larger than the second size particle; and that the third size particle in turn must be caught in the interstices between particles of a fourth size that is 3 to 5 times larger than the third size particles. It is further theorized that the seal is impaired by particle sizes falling between this step wise increase, probably because the inbetween particles interfere with the bridging action of the next largest size particle in the series. In other words, the largest size particle should be essentially all of the same diameter, and preferably be 3 times greater than the next smallest size particle, which in turn should be approximately 3 times larger than the next smallest size particle etc. to allow a proper bridging or nesting action to strain out the colloidal or near colloidal size clay particles which form the final seal.

Stated in another way, it may be said that a seal for particles having a diameter X with respect to a surface having foramina approximately 50 times larger than X, can be made using first, second and third size particles; the first of which have a size 3 to 5 times larger than X, the second of which have a diameter 3 to 5 times larger than the first, and the third of which have a diameter 3 to 5 times larger than the second size particles. Approximately equal parts by weight of each size particles seem to provide the necessary greater amount of the first size particles than is required of the second, and to provide the necessary greater amount of the second than the third, etc. A variation in these amounts of plus or minus 50% appears to give effective sealing gradations.

The woody ring portion of corncobs appears particularly suited for use as a lost circulation additive because it has a Mohs hardness of 4.5 when dry but when west is slightly plastically deformable. Nut shells shed water and do not have this property. A bridge formed under pressure therefore causes the woody ring particles to flatten slightly at their points of bearing between the particles to thereafter restrain movement between the particles of the bridge.

It will be apparent that the objects heretofore enumerated, as well as others, have been accomplished, and that there has been provided both a new and improved type of lost circulation additive; and a new and improved particle size distribution for preventing particles of a predetermined size from passing through openings of a much larger size. By roller milling, attrition milling, air aspirating, and screening whole ground corncobs, the pith and chaff which normally cling to the woody ring portion of the cob is separated therefrom to give a high purity woody ring material. The screened particles are quite uniform in size, and do not appreciably affect the yield point of drilling muds. Because it is difficult to obtain large size granular particles of some of the prior art materials, particularly nut shells, particles larger than 420 micron of applicants' material will have use as a replacement for some of the larger size particles of prior art lost circulation additives—particularly for those particles larger than 1.4 mm. Prior art lost circulation additives may also be improved by using the preferred particle size distributions taught by this specification.

While the invention has been described in considerable detail, we do not wish to be limited to the particular embodiments described, and it is our intention to cover hereby all novel adaptations, modifications and arrangements thereof which come within the practice of those skilled in the art, and which come within the purview of the following claims.

We claim:

1. A sealing material for slurries comprising: a gradation of particulate matter having sizes above and below 420 micron in which a substantial amount of the sizes above 420 micron are particle of a ground predominantly woody ring containing fraction of corncobs essentially free of the chaff and pith portions of the cob and having a bulk density greater than approximately 20 lbs/ft.$^3$.

2. The sealing material of claim 1 wherein the sealing material contains particles larger than approximately 1.4 mm that are the woody ring portion of the cob essentially free of the chaff and pith portions of the cob.

3. The sealing material of claim 1 containing particulates greater than 2.4 mm have a bulk density greater than approximately 20 lbs/ft.$^3$.

4. The sealing material of claim 1 wherein the particulate material larger than 75 micron is the woody ring portion of the cob essentially free of the chaff and pith portions of the cob.

5. A sealing material for slurries comprising: a gradation of particulate matter composed of particles ranging from approximately 75 micron to at least 2.4 mm in which the preponderance of all particles 2.4 mm and larger are a ground predominantly woody ring containing fraction of corncobs essentially free of the chaff and pith portions of the cob and having a bulk density greater than approximately 20 lbs/ft.$^3$.

6. The sealing material of claim 5 wherein approximately 20 to 50% by weight of said particulate matter has a size between 2.4 mm and 8.0 mm, and from approximately 10% to 40% by weight of said particulate matter has a size between 0.42 mm and 75 micron, said particulate matter of a size between 2.4 mm and 8.0 mm being a granulated corncob fraction having a bulk density of more than approximately 23 lbs/ft.$^3$.

7. The sealing material of claim 5 wherein the particles larger than approximately 420 micron have a bulk density greater than approximately 23 lbs/ft.$^3$.

8. A sealing material for retaining particles having a particle size of X on a surface having foramina up to approximately 50 times larger, said material comprising: first size particles of a nominal size 3 to 5 times larger than X, second size particles having a nominal size 3 to 5 times larger than said first size particles, and third size particles having a nominal size 3 to 5 times larger than said second size particles, and wherein at least one of said first, second and third size particles are graded particles of the predominantly woody ring portion of corncobs essentially free of the chaff and pith portions of the cob and.

9. The sealing material of claim 8 wherein said second and third size particles are graded particles of the woody portion of corncobs.

10. The well drilling operations in which a drilling fluid is pumped down the drill hole, the metod of overcoming loss of the fluid to earth formations through which the hole is drilled, comprising: circulating as the drilling fluid an aqueous drilling mud having suspended therein a sealing material composed of a gradation of particulate matter composed of particle essentially 75 micron and larger in which the preponderance of all particles larger than approximately 2.4 mm are a ground predominantly woody ring containing fraction of corncobs essentially free of the chaff and pith portions of the cob and having a bulk density greater than approximately 20 lbs/ft$^3$.

11. The particulate matter of claim 10 wherein the particles larger than approximately 420 micron are a predominantly woody ring corncob material having a bulk density greater than approximately 23 lbs/ft.$^3$.

12. The method of affecting a seal for slurries of particles having a particle size of X with respect to a surface having foramina up to approximately 50 times larger, comprising: adding a mixture of first, second and third size particles to the slurry with the first size particles being of a nominal size 3 to 5 times larger than X, the second size particles being of a nominal size 3 to 5 times larger than said first size particles, and said third size particles being of a nominal size 3 to 5 times larger than said second size particles, and wherein at least one of said first, second and third size particles are graded particles of the predominantly woody ring portion of corncobs essentially free of the chaff and pith portions of the cob and.

13. The metod of claim 12 wherein said second and third size particles are predomiantly of a fraction of ground corncobs having a bulk density greater than 20 lbs/ft.$^3$.

14. The method of claim 12 wherein said second and third size particles are particles of the woody ring portion of corncobs.

15. A well drilling fluid comprising: an aqueous drilling mud having suspended therein a blend of particulate matter having at least two nominal sizes of solid granules one of which is larger than approximately 420 micron and the other of which has a particle size less than approximately 420 micron, and in which a substantial amount of the particles that are larger than 420 micron are a predominantly woody ring corncob fraction essentially free of the chaff and pith portions of the cob and having a bulk density of at least 20 lbs/ft.$^3$.

16. The well drilling fluid of claim 15 wherein the granules which are less than approximately 420 micron are also of a predominantly woody ring fraction of corncobs having a bulk density of at least 20 lbs/ft.$^3$.

17. The well drilling fluid of claim 15 wherein said particulate matter contains at least 20% of predominantly woody ring corncob particles having a size greater than approximately 1.4 mm.

18. The granules of 15 wherein the particles larger than approximately 420 micron have a bulk density greater than approximately 23 lbs/ft.$^3$.

19. A well drilling fluid comprising: an aqueous drilling mud having suspended therein a blend of particles comprising from approximately 20 to 50% by weight of particles having a size between 2.4 mm and 8.0 mm, and from approximately 10% to 40% by weight of particles having a size between 420 micron and 75 micron, said particles of a size between 2.4 mm and 8.0 mm being a granulated predominantly woody ring fraction of corncobs essentially free of the chaff and pith portions of the cobs and having a bulk density of more than 20 lbs/ft.$^3$.

20. A well drilling fluid comprising: aqueous drilling mud having auspended therein a particle blend comprising: a first portion of from approximately 10% to 60% by weight of particles ranging in size between 8.0 mm and 1.4 mm, a second portion of approximately 10% to 60% by weight of particles ranging in size between 1.4 mm and 0.4 mm, and a third portion of from approximately 10% to 60% by weight of particles ranging in size between 0.4 mm and 75 micron, with the particles larger than 0.4 mm being predominantly woody ring containing granules of corncobs essentially free of the chaff and pith portions of the cob.

21. The well drilling fluid of claim 20 wherein said first portion ranges in size between 8 mm and 2.4 mm and the second portion ranges in size between 1.4 mm and 0.8 mm.

22. The well drilling fluid of claim 20 wherein said first portion ranges in size between 2.4 mm and 1.4 mm, and the second portion ranges in size between 0.85 mm and 0.4 mm.

23. The well drilling fluid of claim 20 wherein said first portion ranges in size between 8 mm and 2.4 mm and the second portion ranges in size between 2.4 mm and 1.4 mm.

24. A lost circulation additive for well drilling, and the like comprising: a gradation of particulate material containing more than approximately 10% by weight of a ground predominantly woody ring fraction of corncobs essentially free of the chaff and pitch portions of the cob, having a particle size larger than 1.4 mm and having a bulk density greater than approximately 20 lbs/ft.$^3$.

25. The lost circulation additive of claim 24 containing at least 10% by weight of particles having a size larger than 2.4 mm and which are a ground fraction of corncobs having a bulk density greater than approximately 20 lbs/ft.$^3$.

* * * * *

UNITED STATES PATENT OFFICE
CERTIFICATE OF CORRECTION

PATENT NO. : 4,247,403
DATED : January 27, 1981
INVENTOR(S) : Kevin M. Foley; David I. B. Vander Hooven and Jerry D. Hull It is certified that error appears in the above–identified patent and that said Letters Patent are hereby corrected as shown below:

Assignees: should read: The Andersons; Rotary Drilling Services Inc. of Maumee, Ohio and Tulsa, Oklahoma, respectively.

Claim 8, last line, "and" should be deleted.
Claim 10, line 2, "metod" should read (method).
Claim 12, last line, "and" should be deleted.
Claim 20, line, 2, "auspended" should read -- (suspended) --.

Signed and Sealed this

Ninth Day of June 1981

[SEAL]

Attest:

RENE D. TEGTMEYER

Attesting Officer     Acting Commissioner of Patents and Trademarks